United States Patent
Bootsman

(10) Patent No.: US 6,561,528 B2
(45) Date of Patent: May 13, 2003

(54) WHEELED DEVICE

(75) Inventor: G. Bootsman, Hoofdoorp (NL)

(73) Assignee: Bootsman Holding B.V., Hofddorp (NL)

( * ) Notice: Subject to any disclaimer, the term of this patent is extended or adjusted under 35 U.S.C. 154(b) by 0 days.

(21) Appl. No.: 10/141,941

(22) Filed: May 10, 2002

(65) Prior Publication Data

US 2002/0163149 A1 Nov. 7, 2002

Related U.S. Application Data

(63) Continuation of application No. 09/424,314, filed as application No. PCT/NL98/00293 on May 25, 1998, now abandoned.

(30) Foreign Application Priority Data

May 21, 1997 (NL) .............................................. 1006101
Sep. 2, 1997 (NL) .............................................. 1006914

(51) Int. Cl.$^7$ ................................................ B62B 1/26
(52) U.S. Cl. ....................... 280/47.26; 280/42; 280/652; 280/43.14; 280/47.19; 280/79.2
(58) Field of Search ......................... 280/42, 651, 652, 280/43.14, 47.11, 47.131, 47.18, 47.19, 47.24, 47.26, 47.27, 47.35, 79.11, 79.2

(56) References Cited

U.S. PATENT DOCUMENTS

| | | | |
|---|---|---|---|
| 875,476 A | 12/1907 | Wasson | |
| 2,905,480 A | 9/1959 | Giovannelli | |
| 2,964,328 A | 12/1960 | Muir | |
| 3,010,775 A | 11/1961 | Giovannelli | |
| 3,050,273 A | 8/1962 | Saunders | |
| 4,305,601 A | * 12/1981 | Berge | 280/304.1 |
| 4,457,527 A | 7/1984 | Lowery | |
| 4,537,106 A | 8/1985 | Rider | |
| 4,538,775 A | 9/1985 | Deissenberger | |
| 4,564,152 A | 1/1986 | Herriage | |
| 4,625,949 A | 12/1986 | Walker | |
| 4,652,062 A | * 3/1987 | Greenwood | 312/209 |
| 4,886,286 A | 12/1989 | Whorton, III | |
| 4,976,450 A | 12/1990 | Ellefson | |
| 4,989,291 A | 2/1991 | Parent | |
| 5,013,055 A | 5/1991 | Labrum | |
| 5,158,243 A | 10/1992 | Sige et al. | |
| 5,207,723 A | 5/1993 | Newby, Sr. | |
| 5,240,264 A | 8/1993 | Williams | |
| 5,333,885 A | 8/1994 | Pullman | |
| 5,344,339 A | * 9/1994 | Cheslock | 439/501 |
| 5,378,005 A | 1/1995 | Norton | |
| 5,484,160 A | 1/1996 | Ek | |
| D371,663 S | 7/1996 | Muller-Deisig et al. | |
| 5,588,659 A | 12/1996 | Boes et al. | |
| 5,642,898 A | 7/1997 | Wise | |
| 5,906,381 A | 5/1999 | Hovatter | |
| 6,047,750 A | 4/2000 | Jensen | |
| 6,071,142 A | * 6/2000 | Blackman | 439/373 |

* cited by examiner

Primary Examiner—Brian L. Johnson
Assistant Examiner—Bridget Avery
(74) Attorney, Agent, or Firm—Young & Thompson

(57) ABSTRACT

Wheeled device with at least one running wheel, a frame and connecting parts on the frame, the connecting parts engaging at least one coiled, collapsed, folded or differently shortened elongated, flexible, preferably string- or tube-like object, such as wire or cable (e.g. electricity guiding) or tube (as for guiding a hydraulic or pneumatic fluid), wherein the object is preferably suspended from the connecting parts, and with at least one container on the frame to contain at least one appliance preferably loose laying.

15 Claims, 6 Drawing Sheets

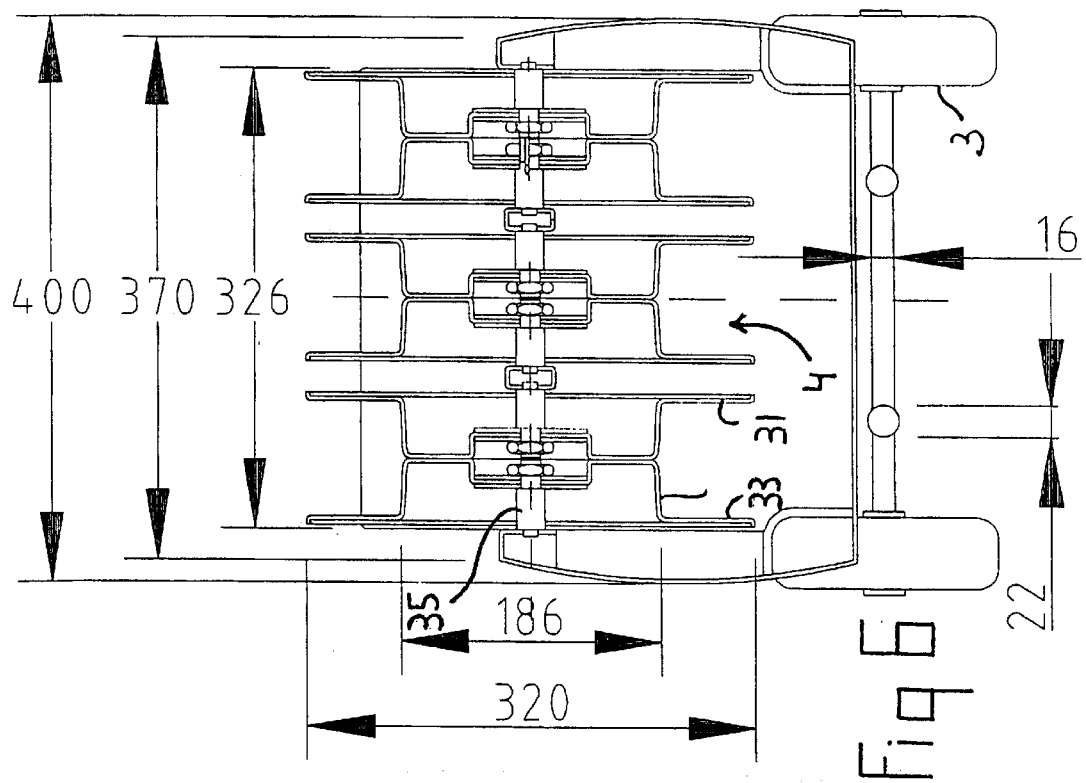
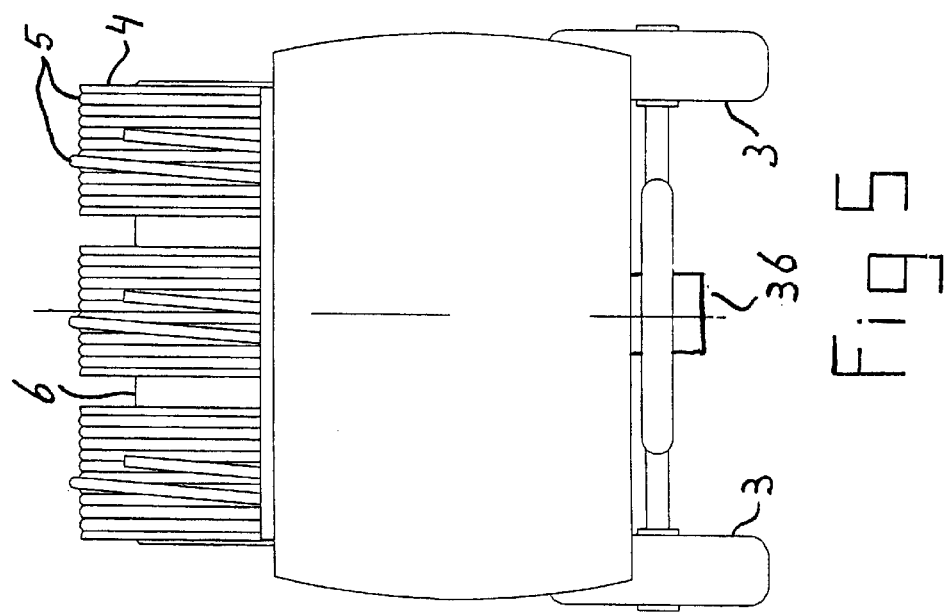

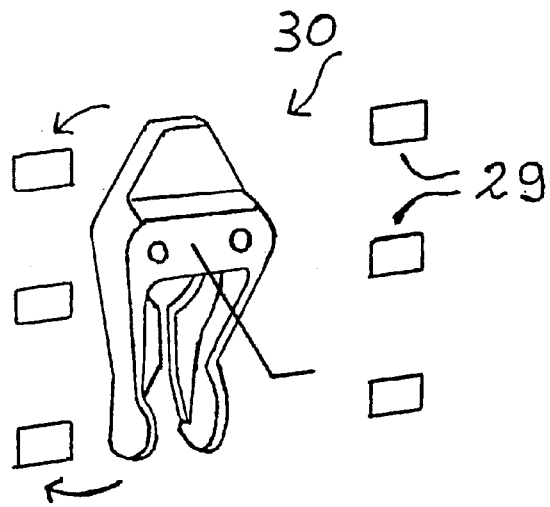
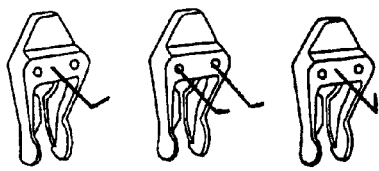
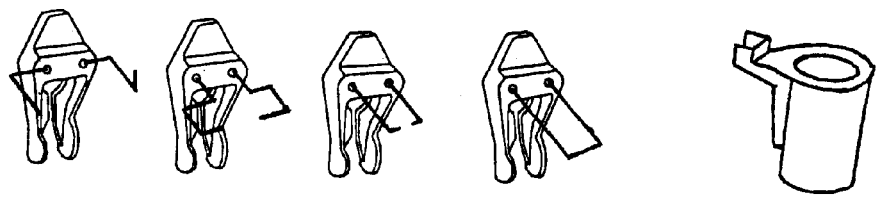
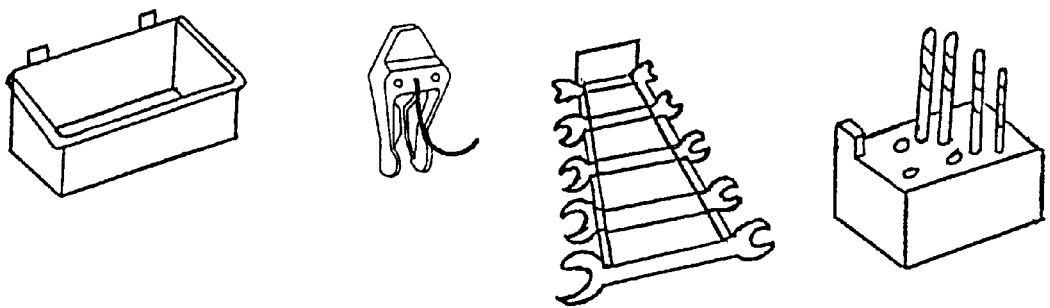
Fig 7

WHEELED DEVICE

This application is a continuation of application Ser. No. 09/424,314, filed on Nov. 22, 1999, now abandoned. Application Ser. No. 09/424,314 is the national phase of PCT International Application No. PCT/NL98/00293 filed on May 25, 1998 under 35 U.S.C. §371. The entire contents of each of the above-identified applications are hereby incorporated by reference.

BACKGROUND OF THE INVENTION

The invention is concerned with a wheeled device, in particular for conveniently transporting and well-organised storing of tools and/or parts. Preferably, standard parts are applied, e.g. the drawers, the wheels, the spring rules, the reels, to keep the cost price low. Convenient application and professional appearance are most important items. In particular assembling and maintenance workers have particular benefits.

SUMMARY OF THE INVENTION

In a preferred embodiment the invention is directed to a tilting utility cart with a frame adapted for movement when tilted from vertical, a running wheel on which the cart moves, a drawer in a recess in the frame, and a rotatable reel that is mounted to the frame below the drawer for coiling and uncoiling an elongate member.

BRIEF DESCRIPTION OF THE DRAWINGS

An elaboration is given on the basis of the drawing.

FIG. 5 is the bottom view.

FIG. 6 is the sectional bottom view according to the line VI—VI in FIG. 1.

FIG. 7 is a principle illustration of the mounting part.

Figure 1:
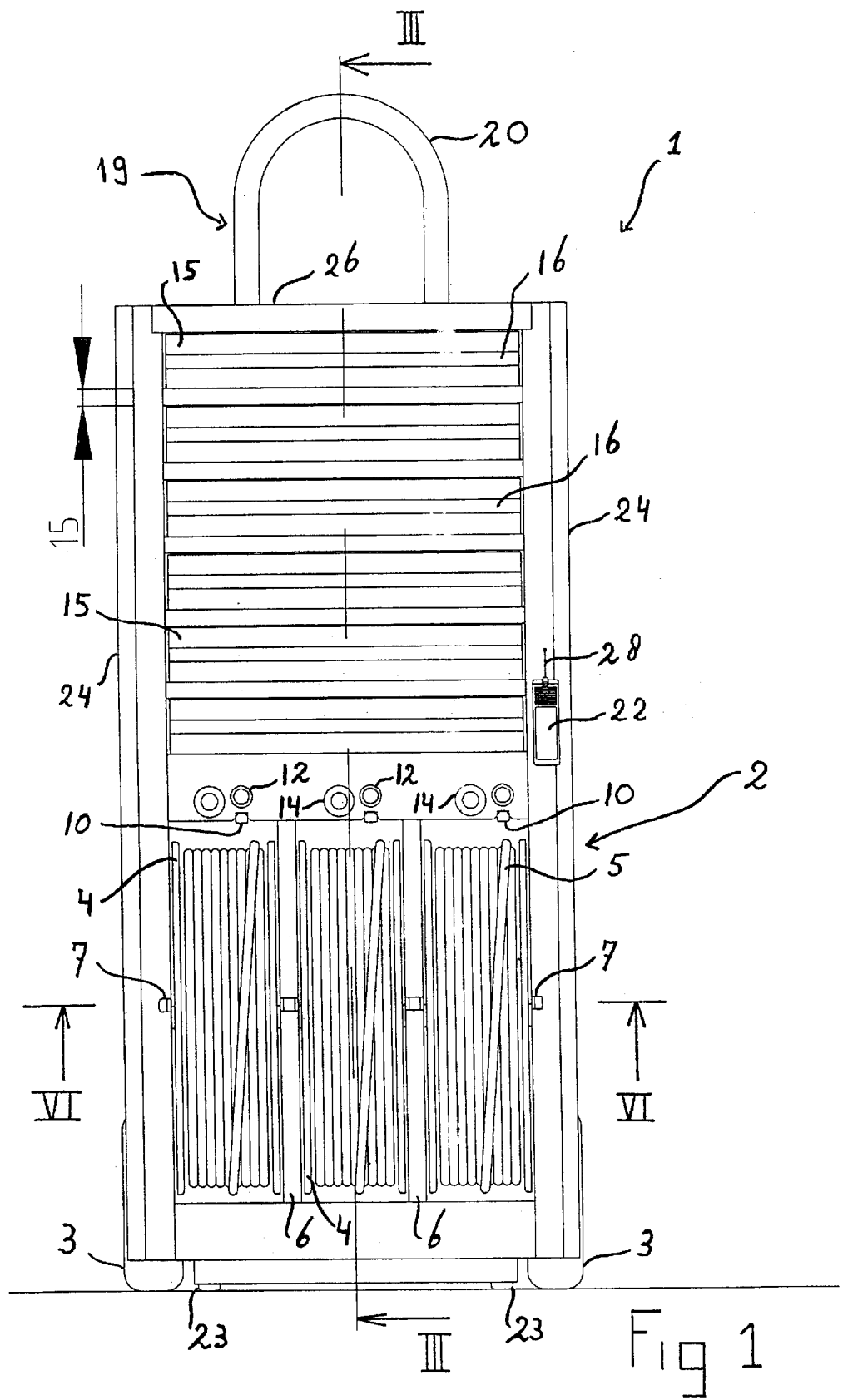
FIG. 1 is the front view.
Figure 2:
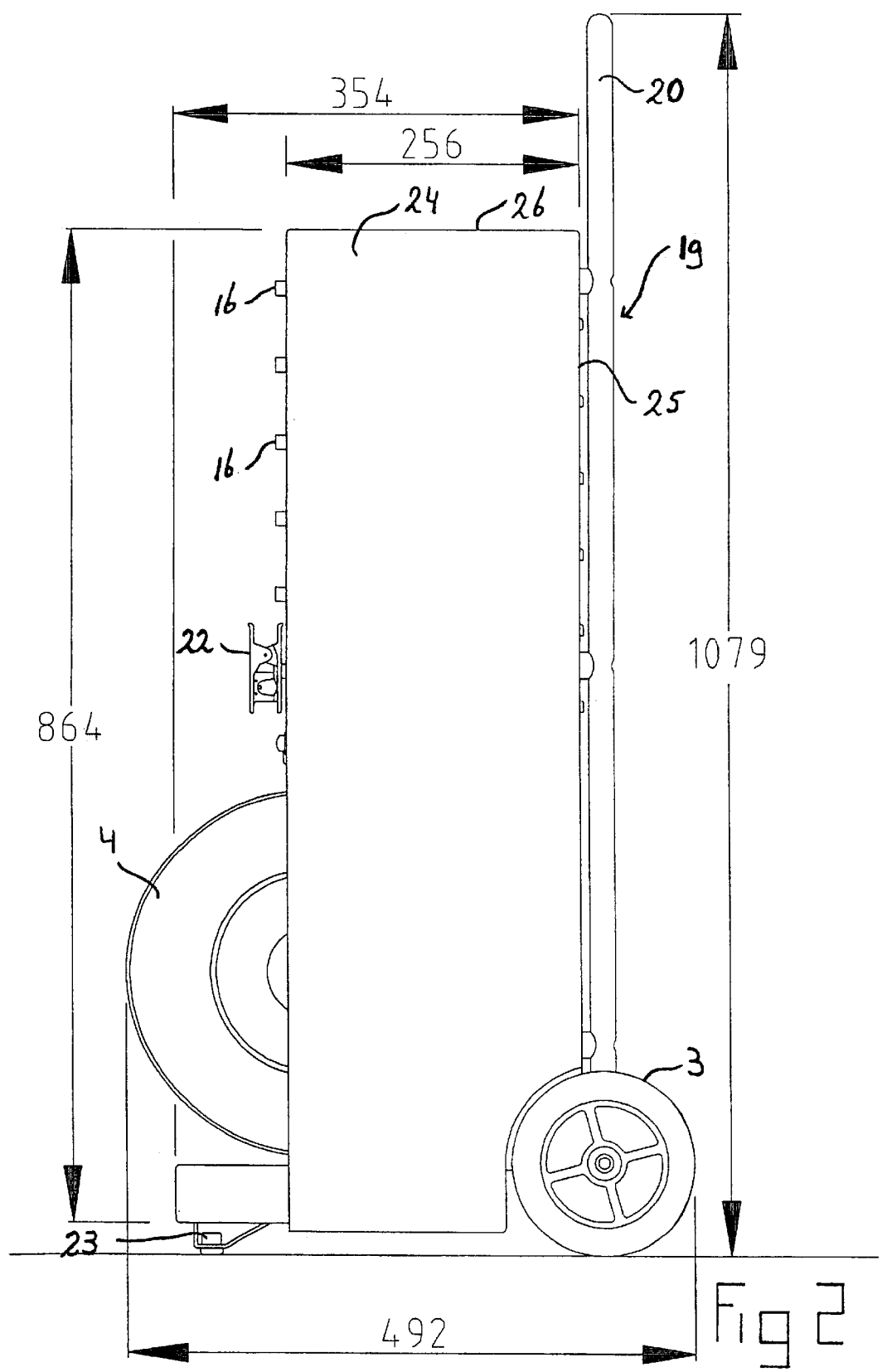
FIG. 2 is the side view.
Figure 3:
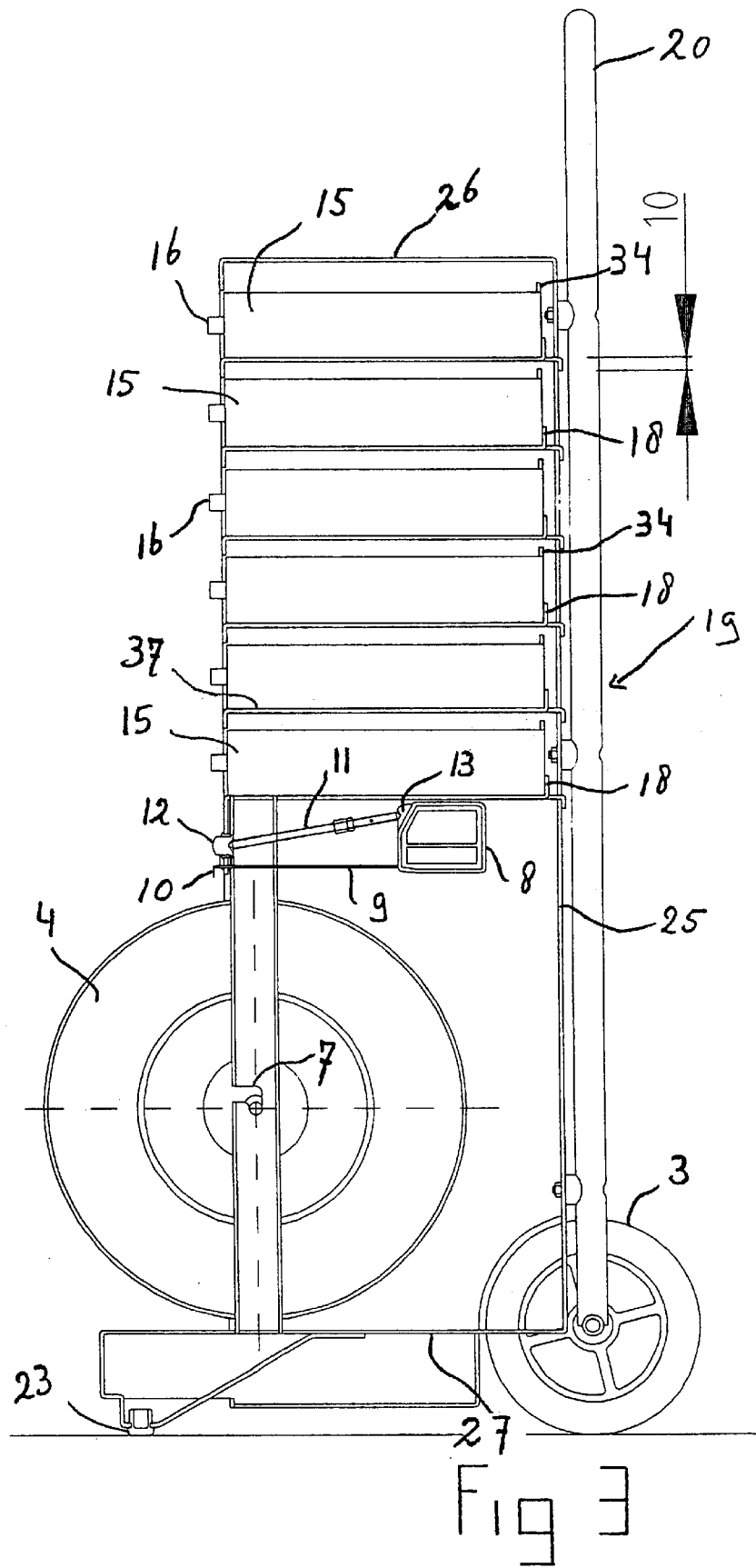
FIG. 3 is the sectional side view according to the line III—III in FIG. 1.
Figure 4:
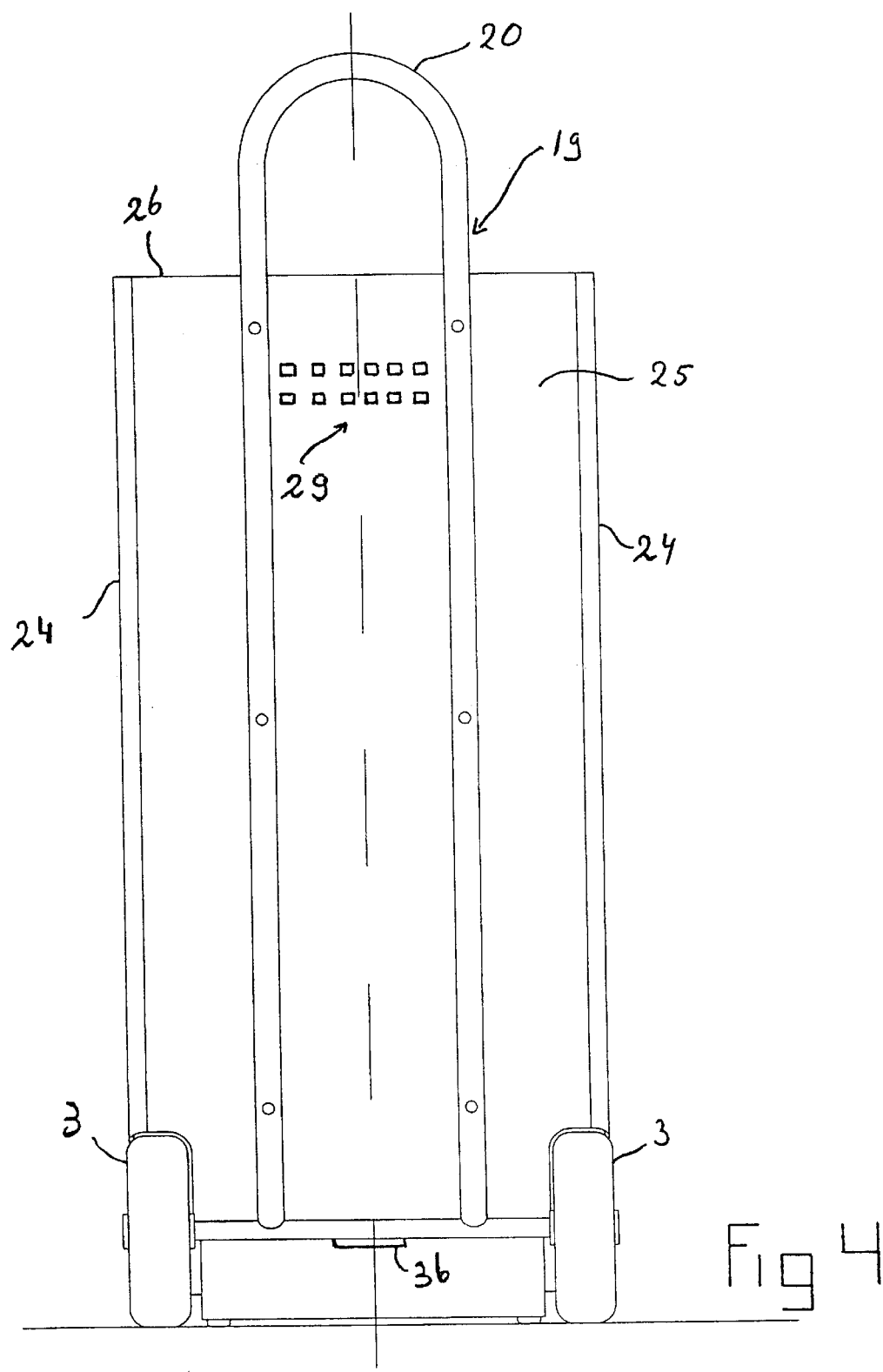
FIG. 4 is the back view.

Indicated dimensions are in millimeters.

List of parts:

| | | | |
|---|---|---|---|
| 1. | device | 14 | passage hole tube or wire |
| 2 | frame (box like) | 15 | drawer |
| 3 | running wheel | 16 | hand grip drawer |
| 4 | reel | 17 | bottom of recess for drawer |
| 5 | tube or wire | 18 | stop for drawer |
| 6 | strip | 19 | U-bracket |
| 7 | ¬ shaped hole | 20 | grip |
| 8 | spring rule house | 21 | cross bar |
| 9 | measuring tape | 22 | scissors |
| 10 | grip end rule | 23 | support |
| 11 | push bar | 24 | side panel |
| 12 | push button | 25 | back panel |
| 13 | release button rule | 26 | upper panel |
| 27 | bottom panel | 32 | core |
| 28 | string | 33 | disc |
| 29 | mounting hole | 34 | stop for drawer |
| 30 | mounting part | 35 | shaft pin |
| 31 | disc | 36 | stepper face |

DESCRIPTION OF THE PREFERRED EMBODIMENT

The reel 4 can preferably be split up in two along a plane substantially perpendicular to the centre line of rotation of the reel. Therefor the reel can be conveniently filled with tube or wire 5 that is supplied in a coil of convenient diameter. The reel can therefor be designed as shown in FIG. 6. Alternatively the reel is comprised of a substantial plane, flat disc 31 and a similar disc 33 but with a central coaxial projecting part 32 projecting from the plane, to make the core of the reel. Both discs are mutually clamped by releasable fixing means on the shaft pin 35. The reels 4 are preferably conveniently removable supported such that replacement or filling of the reel 4 takes minimum time. Instead of three, there can be less or more reels 4. There can be reels at different levels as well, e.g. two levels on top of each other. Reels of differing diameter are possible as well.

Preferably, the passage hole 14 has its edge covered with a harsh material, e.g. rubber, such that the tube 5 is securely held in the hole to prevent slipping from the hole. The tube 5 is uncoiled from the reel via the passage hole 14. The stops 18 and 34 for the drawer 15 prevent the drawer 15 from unintentional removal from the device, and make sure that the front is flush with the device's front if the drawer is closed. The tube 5 is e.g. electrical wire, glass fiber cable, cable, compressed air tube, string, etc.

While the spring rule house 8 is positioned on a large distance from the front face of the device according to the drawings, and a push button 12 and a push rod 11 are provided to actuate the release button of the spring rule, the spring rule house can also be positioned such that said release button is directly accessible from the front of the device to the finger of a controlling person, e.g. because said button 13 projects at least partly from said front. With the measuring tape 9 the appropriate length of the tube 5 to be taken from the reel can be measured. Different measure devices in stead of a spring rule are possible as well, however a spring rule a cheap and reliable standard part offering much comfort.

The drawer 15 can be filled with smaller, loose trays, e.g. in two rows of four trays each, extending behind each other in the width-wise direction of the drawer. Said trays are e.g. filled with the necessary parts, and they are easily removable for e.g. refilling.

The side walls of the device bulge outwards (FIG. 5) and the wheels preferably do not project from the side walls, such that there is less risk for bumping or jawing when driving with the device.

The U-bracket 19, extending over at least virtually the height of the device, can be eliminated as well, and the handle 20 can be replaced as well by e.g. a handle mounted on the upper panel 26, being e.g. a U-bracket the legs of which first extend upward from the panel 26 and then to the back such that the middle of the U projects above or outside the back panel 25. The shaft extending between the wheels 3 can extend within the device as well, such that it is invisible.

The scissors 22 is connected to a string that is shortened and payed out automatically, and is therefor e.g. coiled on an automatic reel. In this way the scissors 22 can not be lost and can be used to cut the tube 5. In this way different tools can be connected to the device as well, such that it can be brought to some distance from the device to be used there, while storing happens at least virtually automatic. The string can be stretchable as well, like elastic band.

The back panel 25 has a pattern of mounting holes 29 to selectively clamp one or more mounting parts 30. In this way e.g. tools can be suspended from the back side. The pattern offers flexibility of the lay out of the tools to be suspended. It will be appreciated that the same is applicable to the other side of the device. The pattern can be shaped different as well. The shape of the mounting holes 29 can be different as well, e.g. depending on the type of mounting parts that are used. In this embodiment the mounting parts are easily removable, so called hang-in parts. However they can be permanently provided as well, e.g. by screw or clinch fasteners, such that no pattern of mounting holes 29 is visible in that case. The mounting parts can also be embodied such that the tools are clamped thereon, e.g. by yielding brackets known as such. FIG. 7 shows several mounting parts to be hung in the holes 29.

The stepper face 36 at the bottom side can be used to hold the device during tilting. The two wheeled embodiment serves users comfort: is automatically braked and well controllable. The large wheels allow driving over rough surfaces. However, a multi wheeled embodiment, e.g. with a caster wheel at each corner, is possible too.

Different from the device as indicated in the drawing, it can have merely drawers or merely reels or differently stored tube or wire or equivalent. To prevent automatic extension of one or more drawers by tilting forward from the backward tilted drive position to the upright rest position, convenient brake- or stop means can be provided for such. According to a preferred embodiment the drawers can be guided along inclined drawer guides extending upward toward the front, wherein the inclination angle is preferably about 5° or 10° with the horizontal in the rest position of the device. In stead the drawers can have an inclined bottom to arrive at the same effect such that the drawer rises some during extension. Different alternatives are e.g. a stop that is merely active in the area if the drawer is fully or almost fully closed, such as an edge, such that the drawer must be lifted some prior to extension, or a magnet closure, but a manually actuated mechanical locking mechanism as well. To allow that the device can be layed on its back, e.g. for transport in a car of the so called station wagon type, it is preferable to provide the drawers such that no contents can roll or slide therefrom if the device is on its back. The drawer is therefor e.g. provided with a lid. Alternatively at least one of the trays in the drawer is provided with a lid. Most preferred is the provision of the device with a recess for a drawer having a top sheet 37 at a small distance above the upper side of the drawer in it, which sheet, in top view, at least substantially covers the drawer, such that no contents can be lost from the drawer. The distance between the top of the drawer and the top sheet depends on the dimensions of the parts and/or tools that are stored in the drawer, and is preferably about one cm. to a maximum. The top sheet can be completely closed, but can have holes or be e.g. a grid, the openings of which are small such that parts and/or tools can not fall therethrough or are hooked therein. The top sheet 37 can be integral with the drawer guide for the drawer immediately above. As a further preferred means for transport on its back, e.g. to move the device on its back in a space the height of which is smaller than that of the device standing upright, the device can have one or more further wheels at some distance above the wheels 3, e.g. at its back close to the handle.

What is claimed:

1. A tilting utility cart comprising:

a frame adapted for movement when said frame is tilted from a vertical upright rest position;

at least one running wheel mounted to a lower portion of said frame and on which the cart moves when said frame is tilted;

at least one drawer in a recess in said frame for containing a loose part, said drawer being movable between a retracted position and an extended position while being supported by said frame and being arranged and structured so that during movement of the cart when said frame is tilted from vertical said drawer maintains its function of containing a loose part; and at least one rotatable reel containing a coiled tube and that is mounted to said frame below said drawer for coiling and uncoiling said coiled tube while mounted to said frame; and said frame having an opening for passage of a free end of said coiled tube to outside said frame, said opening having a rubbery edge coating to deter unintended movement of said coiled tube through said opening, said opening having a cross sectional dimension slightly larger than a corresponding cross sectional dimension of said coiled tube so that said coiled tube is uncoiled from said reel by pulling on said free end to provoke passage of said coiled tube through said opening.

2. The cart of claim 1, wherein said drawer extends substantially an entire width of said frame.

3. The cart of claim 1, further comprising a handle at a back of the cart for tilting the cart.

4. The cart of claim 3, wherein said at least one running wheel is at the back of the cart.

5. The cart of claim 1, wherein a rotational axis of said at least one running wheel is parallel to a rotational axis of said at least one reel.

6. The cart of claim 1, comprising at least two of said drawers that are aligned above each other above said reel.

7. The cart of claim 1, comprising at least two of said reels adjacent each other, each containing one said coiled tube, and each having a rotational axis substantially parallel to said rotational axis of said running wheel and at least two of said drawers that are aligned above each other above said reels.

8. The cart of claim 1, wherein said frame provides a box containing said drawer and wherein said box makes an angle of substantially 90° with the horizontal when said frame is in said rest position and wherein said drawer is supported by said frame such that it is extendable and retractable in a direction parallel to the horizontal while said frame is in said rest position.

9. The cart of claim 1, wherein said drawer is designed such that said loose part can be removed from said drawer or placed in said drawer while said drawer is in said extended position and being supported by said frame.

10. The cart of claim 9, wherein said drawer has an open top side such that said loose part can be removed from said drawer or placed in said drawer through said top side while said drawer is in said extended position and being supported by said frame.

11. The cart of claim 6, wherein said frame provides a box containing said drawer and wherein said box makes an angle of 90° with the horizontal when said frame is in said rest position and wherein said drawer is supported by said frame such that it is extendable and retractable in a direction parallel to the horizontal while said frame is in said rest position and wherein said drawer is designed such that said loose part can be removed from said drawer or placed in said drawer while said drawer is in said extended position and being supported by said frame.

12. The cart of claim 11, wherein said drawer extends an entire width of said frame and said at least one running wheel has a rotational axis parallel to a rotational axis of said at least one reel.

13. The cart of claim 1, further comprising a retractable measuring tape inside said frame;
   said frame having a first surface with a first opening through which said coiled tube passes and a second opening through which said measuring tape passes, said first and second openings being directly adjacent to each other in said first surface so that said measuring tape measures a length of said coiled tube-passing through first opening.

14. A tilting utility cart comprising:
   a frame adapted for movement when said frame is tilted from a vertical upright rest position;
   at least one running wheel mounted to a lower portion of said frame and on which the cart moves when said frame is tilted;
   at least one drawer in a recess in said frame for containing a loose part, said drawer being movable between a retracted position and an extended position while being supported by said frame and being arranged and structured so that during movement of the cart when said frame is tilted from vertical said drawer maintains its function of containing a loose part; and
   at least one rotatable reel containing a coiled tube and that is mounted to said frame below said drawer for coiling and uncoiling said coiled tube while mounted to said frame;
   wherein said frame has a front side, and further comprising a passage in the front side for passage of a free end of said coiled tube to outside said frame while coiled tube is being coiled and uncoiled, and
   wherein said passage is slightly larger in diameter than said coiled tube such that said coiled tube is deterred from unintended movement through said passage and so that said coiled tube is uncoiled from said reel by pulling on said free end to provoke passage of said coiled tube through said passage.

15. The cart of claim 13, wherein said measuring tape has a free end projecting outside said frame through said second opening, said measuring tape is extendable outside said frame by pulling on said free end, and said first and second openings are aligned so that said coiled tube and said measuring tape initially extend parallel to each other outside said frame.

* * * * *